(12) United States Patent
Rowley

(10) Patent No.: US 9,403,327 B2
(45) Date of Patent: Aug. 2, 2016

(54) METHOD OF MAKING A CROSSLINKED OVERMOLDED ASSEMBLY

(71) Applicant: Mercury Plastics, Inc., Middlefield, OH (US)

(72) Inventor: William W. Rowley, Chagrin Falls, OH (US)

(73) Assignee: Mercury Plastics, Inc., Middlefield, OH (US)

(*) Notice: Subject to any disclaimer, the term of this patent is extended or adjusted under 35 U.S.C. 154(b) by 145 days.

(21) Appl. No.: 14/503,917

(22) Filed: Oct. 1, 2014

(65) Prior Publication Data

US 2016/0032067 A1 Feb. 4, 2016

Related U.S. Application Data

(63) Continuation of application No. 13/357,260, filed on Jan. 24, 2012, now Pat. No. 8,865,051.

(51) Int. Cl.
| | |
|---|---|
| *B29C 71/04* | (2006.01) |
| *C08J 7/18* | (2006.01) |
| *B01J 19/08* | (2006.01) |
| *B29C 65/82* | (2006.01) |

(Continued)

(52) U.S. Cl.
CPC ............. *B29C 71/04* (2013.01); *B01J 19/085* (2013.01); *B29C 65/002* (2013.01); *B29C 65/8215* (2013.01); *B29C 65/8246* (2013.01); *C08J 7/18* (2013.01); *B01J 2219/08* (2013.01); *B29K 2023/08* (2013.01); *B29L 2023/22* (2013.01); *B29L 2031/24* (2013.01); *C08J 2323/06* (2013.01)

(58) Field of Classification Search
CPC . B29K 2023/08; B29C 65/002; B29C 65/004
USPC ........................................................... 264/485
See application file for complete search history.

(56) References Cited

U.S. PATENT DOCUMENTS

| | | | |
|---|---|---|---|
| 2,668,133 | A | 2/1954 | Brophy |
| 4,225,373 | A | 9/1980 | Bieler et al. |

(Continued)

OTHER PUBLICATIONS

U.S. Appl. No. 12/827,424, filed Jun. 30, 2010.

(Continued)

*Primary Examiner* — Benjamin Schiffman
(74) *Attorney, Agent, or Firm* — Hahn Loeser & Parks, LLP

(57) ABSTRACT

A process for making a crosslinked assembly includes steps of: selecting a desired performance parameter for a molded assembly of a first polymeric component and a second polymeric component bonded to the first polymeric component, controlling a first crosslinking percentage for the first polymeric component and a second crosslinking percentage for the second polymeric component independently to provide the desired performance parameter for the assembly, orienting the assembly at an angle between an orientation axis of the assembly and a electron beam direction, exposing the oriented assembly a predetermined number of times (N) to the electron beam operable to deliver a predetermined amount of radiation (R) in the electron beam direction providing a total radiation exposure proportional to (N×R) providing the first component crosslinking percentage and the second component crosslinking percentage, the resulting assembly having the desired performance parameter.

8 Claims, 4 Drawing Sheets

(51) Int. Cl.
*B29C 65/00* (2006.01)
*B29L 23/00* (2006.01)
*B29L 31/24* (2006.01)
*B29K 23/00* (2006.01)

(56) References Cited

U.S. PATENT DOCUMENTS

| | | | |
|---|---|---|---|
| 4,267,080 A | 5/1981 | Yokoyama et al. |
| 4,318,763 A | 3/1982 | Bieler et al. |
| 4,361,606 A | 11/1982 | Butler et al. |
| 4,443,392 A | 4/1984 | Becker et al. |
| 5,252,265 A | 10/1993 | Cirri |
| 5,565,160 A | 10/1996 | Makuuchi et al. |
| 5,725,715 A | 3/1998 | Makuuchi et al. |
| 5,895,695 A | 4/1999 | Rowley |
| 6,165,220 A | 12/2000 | McKellop et al. |
| 6,287,501 B1 | 9/2001 | Rowley |
| 6,365,089 B1 | 4/2002 | Krebs et al. |
| 6,464,926 B1 | 10/2002 | Merrill et al. |
| 6,818,171 B2 | 11/2004 | Wang et al. |
| 6,849,224 B2 | 2/2005 | Wang et al. |
| 7,205,339 B2 | 4/2007 | Muratoglu |
| 7,381,752 B2 | 6/2008 | Muratoglu |
| 7,781,494 B2 | 8/2010 | Okada et al. |
| 7,790,779 B2 | 9/2010 | Muratoglu |
| 7,850,898 B1 | 12/2010 | Rowley et al. |
| 2001/0027345 A1 | 10/2001 | Merrill et al. |
| 2002/0007219 A1 | 1/2002 | Merrill et al. |
| 2010/0140516 A1 | 6/2010 | Butuc |

OTHER PUBLICATIONS

U.S. Appl. No. 12/618,226, filed Nov. 13, 2009.
U.S. Appl. No. 13/312,524, filed Dec. 6, 2011.
U.S. Appl. No. 12/618,296, filed Nov. 13, 2009.
U.S. Appl. No. 12/618,158, filed Nov. 13, 2009.
U.S. Appl. No. 09/682,881, filed Oct. 29, 2001.
U.S. Appl. No. 10/905,974, filed Jan. 28, 2005.
Radiation Crosslinking of Polymers, Lewis A. Parks, http://www.sterigenics.com/crosslinking/crosslinking.html Feb. 2010.
Crosslinked Polyethylene, S M Tamboli, S T Mhaske, D D Kale, Indian Journal of Chemical Technology, Nov. 2004.

METHOD OF MAKING A CROSSLINKED OVERMOLDED ASSEMBLY

This application is a continuation of U.S. patent application Ser. No. 13/357,260, filed Jan. 24, 2012.

BACKGROUND

This invention relates to assemblies of components of molded and crosslinked polymer materials, and more particularly polymer components bonded together in an assembly, and then the polymers crosslinked to provide desired properties.

Molding of components from polymer materials has been known by various applications such as injection molding, extruding, blow molding, forming, AIR-CORE® pressure forming of extrusions, and other molding and forming processes. Molded components have been assembled together to form assemblies by mechanical and thermal methods, chemical processes, ultrasonic and vibratory welding, and other bonding. In one application, such as disclosed in U.S. Pat. Nos. 5,895,695 and 6,287,501, one polymer component was injection overmolded onto a second polymer component. In another example disclosed in U.S. Pat. No. 7,850,898, one extruded polymer component was molded over the end of a second extruded polymer component.

In the past, such assemblies were configured to pass a desired performance test. In plumbing applications, for example, a tube and fitting assembly for connection to a faucet or other fixture was required to withstand an internal water pressure under elevated temperature conditions without leaking. In certain appliance applications, a molded tank assembly was required to withstand an internal water or air pressure test without leaking. Other assemblies were required to withstand other performance specifications including pull tests, drop tests, impact tests, creep resistance tests, odor and taste tests, life tests, and other various strength and performance tests as desired.

For some applications in the Prior Art, the polymers used in polymer assemblies were crosslinked to achieve the desired performance. In the example of U.S. Pat. No. 6,287,501, the tube and the overmolded component were crosslinked to desired amounts using chemical crosslinking, e.g., by a silane process wherein some crosslinking occurred during molding and was completed in a hot bath after molding. When polyethylene was used for the application, the chemical crosslinked material was called PEX-B when silane was used as the crosslinking agent. PEX-B enabled molders to crosslink the components of the assembly as discussed in U.S. Pat. No. 6,287,501. With chemical crosslinking such as PEX-B, at least a part of the crosslinking occurred during the extrusion and molding processes. This limited the application of chemical crosslinking when creating assemblies by processes of overmolding or other molding, thermal, or welding assembly processes by which components are molded together by fusion or melting between the materials of the components. As crosslinking progressed, the increasing crosslink percentage meant that there were fewer thermoplastic bonding sites remaining for melt fusion between one component and another component during overmolding or other assembly, which formed a bond between components that was less robust. The less-robust connections were not desirable in certain applications such as pressurized water fittings, where connection failure could enable water to free-flow from the assembly for extended periods.

Crosslinking a polymer improves or enhances various properties of the material, with the amount of change often increasing with increasing amount of crosslinking. For example, crosslinking increases the thermal deflection and softening temperatures of polymers. For certain polymers, crosslinking may increase abrasion and chemical resistance, lower elongation, increase tensile strength, decrease stress cracking, and improve toughness. Other properties may be improved or enhanced by crosslinking certain polymers. As such, crosslinking of less expensive polymers such as polyethylene has been practiced as a way to extend the life and performance of the polymer to what is required for certain applications and not normally attained by the same polymer in its uncrosslinked state, for example hot and cold water applications. According to standards for certain applications, polyethylene must be crosslinked to a minimum of 65% crosslinked to meet the required performance parameter, meaning that 65% of the polymer is crosslinked and the balance of the polymer remains thermoplastic. In the past, performance was obtained by crosslinking each component separately to accomplish 65% minimum crosslinking. Components were crosslinked separately because each component needed its own level of irradiation under an electron beam to achieve the desired crosslinking. While this provided the specified crosslink amount in every part, the crosslinked components had to be assembled with limited ability to form bonded and molded connections because the crosslinking inhibited bonding. In the Prior Art, as illustrated for example by U.S. Pat. Nos. 5,895,695 and 6,287,501, to create a bond between the components, the overmolded portion had to be made at the earliest time when the base underlying polymeric profile was the least crosslinked to provide more thermoplastic bonding for a material to material bond.

To promote complete bonding between molded components in the assembly, components of uncrosslinked materials have been molded and bonded together and then the assemblies crosslinked after molding using radiation, by passing the assemblies under an electron beam. When polyethylene was used for the application, the material crosslinked by radiation was called PEX-C. For PEX-C, overmolding of a thermoplastic component onto a second component had to be done prior to crosslinking the second component so that the second component retained its thermoplasticity for a material to material bond.

Crosslinking is a process in which carbon atoms of polymer chains are joined together to form a network structure. Crosslinking forms a covalent chemical bond between the polymer chains, which are typically carbon to carbon bonds or a chemical bridge linking two or more carbon atoms. During the crosslinking process, exposing the polymer to radiation, such as an electron beam, displaces hydrogen atoms from the polymer chains, resulting in the formation of a free radical where each hydrogen was removed. Free radicals are highly reactive molecular fragments having one or more unpaired electrons. The free radicals are unstable and typically will seek another free radical or will react with unsaturated compounds to form a stable bond. A cross-link forms when a free radical on one polymer chain bonds with a free radical on another polymer chain linking the two chains together. Two or more chains can join together where a free radical is generated. Alternatively, a molecular bridge connects between free radical sites on two or more polymer chains to form a cross-link. As irradiation progresses, more and more bonds are formed to create a cross-linked structure. When crosslinked by exposure to electron beam, such as PEX-C, the cross-links typically formed are carbon to carbon bonds between the polymer chains. In chemical crosslinking using silane, a silane molecule such as vinyl trimethoxysilane is grafted onto the polymer chain. The silane molecule is typically grafted by using peroxide to generate a free radical on the polymer chain, to which the silane attaches. Then, the silane/polyethylene copolymer is crosslinked by exposure to water with the aid of a catalyst. The water enables hydrolysis and subsequent condensation reactions form cross-links in which the silane molecule forms stable siloxane (Si—O—Si) molecular bridges between the polymer chains.

In many polymeric applications, antioxidants were provided to inhibit oxidation of the polymer during molding and other processing as well as in its desired application. However, the antioxidants in the polymer during irradiation reacted with free radicals needed for crosslinking resulting in a decrease in crosslink density. For this reason, conventional wisdom in the prior art was to limit the use of antioxidants in order to obtain the desired crosslink percentage.

When crosslinking by radiation of a polymeric assembly of two or more components that may have varying wall thicknesses, the assembly was passed under the electron beam oriented in a purposeful orientation. Alternatively, for certain applications, multiple assemblies were placed into a box in a random orientation. In either event, the amount of crosslinking of one component in the assembly was always dependent upon the amount of crosslinking of the other components in the assembly. To achieve a desired crosslinking percentage in a specified component of the assembly, the crosslinking percentage of other components in the assembly may have been higher or lower than the specified component dependent upon the radiation delivered to crosslink the specified component.

To further explain, an electron beam source emits a constant stream of electrons at a set power level. When the assemblies passed through an electron beam and the electron beam impinged upon the assembly, the material forming the assembly closest to the source of the beam received the highest amount of radiation, and hence the most crosslinking, and the material furthest from the source of the beam received the least amount of radiation, and hence the least crosslinking. On a pass under the beam, the assemblies received a diminishing amount of radiation through the material further from the beam as the beam passed through the thickness of the material, and thereby non-uniform crosslinking. To compensate for the effect of diminishing radiation, the assemblies had to be turned over to orient the surfaces previously on the bottom to face the top, and passed under the beam again so that portions previously receiving a diminished amount of radiation received additional exposure to the electron beam. In some applications, each assembly had to be passed under the beam multiple times to achieve a minimum crosslinking percentage. Typically, one of the parts of the assembly would crosslink at a different rate than the other. In certain applications, one component of the assembly would reach a desired crosslinking percentage before the other, providing different crosslink percentages in different components in the assembly. Alternatively, the assembly was further irradiated until all of the parts had a crosslinking percentage greater than a desired amount. Portions of the assembly having thicker wall sections would absorb radiation reducing the crosslinking of portions of the assembly further from the electron beam beneath the thick sections further providing variable crosslink percentages. In any event, when crosslinking by radiation, the amount of crosslinking of one component was dependent upon the amount of crosslinking of the other components in the assembly.

While the prior processes obtain required crosslinking amounts, additional passes under the electron beam to bring lower crosslinked components up to a desired level increase the cost of the assembly. There remains a need for a method of making a polymeric assembly crosslinked by radiation where the crosslinking percentage of each component is independently controlled so that each component is sufficiently crosslinked to meet required performance parameters, providing a polymeric assembly wherein each component has about the same crosslink percentage or each component has different crosslink percentages as desired.

SUMMARY OF THE DISCLOSURE

What is disclosed is a process for making a crosslinked assembly comprising the steps of:
  selecting a desired performance parameter for a molded assembly including a first polymeric component of a first thermoplastic material having a first component wall thickness and a first connection portion, and a second polymeric component of a second thermoplastic material having a second component wall thickness and a second connection portion bonded to the first connection portion,
  controlling a first crosslinking percentage for the first polymeric component and a second crosslinking percentage for the second polymeric component independently to provide the desired performance parameter for the assembly,
  orienting the assembly at an angle (A) between an orientation axis of the assembly and a electron beam direction,
  exposing the oriented assembly a number of times (N) to the electron beam operable to deliver a predetermined and substantially constant amount of radiation (R) in the electron beam direction providing a total radiation exposure (E) proportional to (N×R) providing the first component crosslinking percentage and the second component crosslinking percentage, the crosslinked assembly having the desired performance parameter.

The step of controlling first and second crosslinking percentages may comprise varying for each of the components in the assembly independently at least one parameter selected from the group consisting of component wall thickness, antioxidant additive, crosslinking agent additive, polymer density, and shielding of the component during crosslinking to provide the desired performance parameter for the assembly after crosslinking by the electron beam delivering a predetermined substantially constant amount of radiation.

The step of controlling first and second crosslinking percentages may comprise providing a first antioxidant concentration in the first polymeric component and a second antioxidant concentration in the second polymeric component, the first antioxidant concentration different than the second antioxidant concentration, where the first and second antioxidant concentrations are each a function of one or more parameters selected from the group consisting of the first thermoplastic material, the second thermoplastic material, the first component wall thickness, the second component wall thickness, the angle (A) between the assembly orientation axis and an electron beam direction, predetermined amount of radiation (R) delivered by a electron beam in the electron beam direction, number of times (N) for exposing the oriented assembly to the radiation, the final first component crosslinking percentage, and the final second component crosslinking percentage.

These and other novel features of the subject matter of the present application, as well as details of illustrated embodiments thereof, will be more fully understood from the following description and drawings.

DETAILED DESCRIPTION OF PARTICULAR EMBODIMENTS

Figure 1:
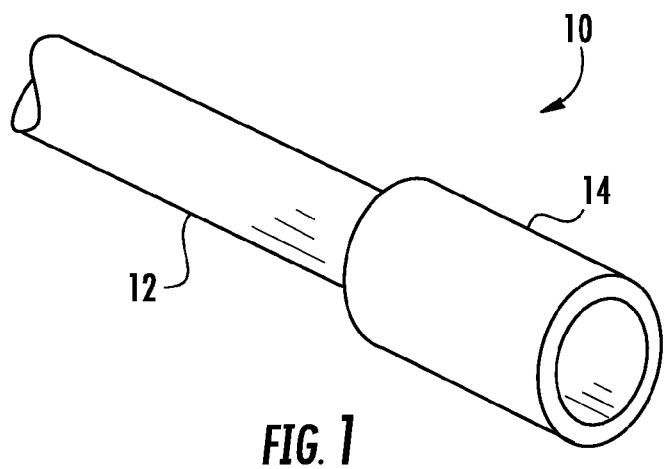
FIG. 1 is a partial front perspective view of an exemplary assembly of a tube and an overmolded fitting according to the present invention.
Figure 2:
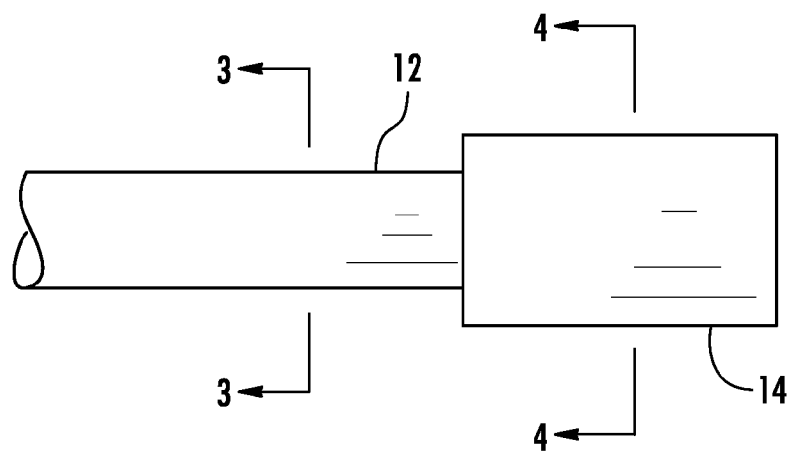
FIG. 2 is a partial plan view of the assembly shown in FIG. 1.

A method for making a crosslinked assembly is disclosed, where it is desirous that the assembly meets a performance specification. The performance specification may be provided by a customer, and/or a performance parameter required by a desired application as further discussed below. In particular, the present method is directed to assemblies of a plurality of two or more components molded of polymeric materials. The molded assembly may include at least a first polymeric component and a second polymeric component, and the components are bonded together at interfacing connection portions. As used herein, the term "molded" broadly means shaped or formed, including, but not limited to, by injection molding, extruding, blow molding, injection-blow molding, vacuum thermoforming, pressure forming, AIR-CORE® pressure forming of extrusions, and any other molding and forming processes for making polymeric components. As used herein, the term "bonded" means joined together in any fashion, including, but not limited to, by way of mechanical processes, thermal processes, chemical processes, ultrasonic and vibratory welding, and other bonding techniques for assembling polymeric components. In one alternative, two or more components are bonded by a material to material bond, or melt fusion, whereby the polymer composition of one component and the polymer composition of another component are sufficiently similar or compatible so as to permit blending or alloying to occur at least in an interfacial region between the bonded components. Stated another way, for melt fusion at least a portion of the polymer compositions of the bonded components are miscible.

In one example of the present method, the polymeric components in the assembly may be molded of a material that can be enhanced by crosslinking, and to achieve the desired performance parameter, the polymeric materials in the assembly may be crosslinked. For example, the polymeric components may be polyethylene, and the assembly may be crosslinked by exposure to an electron beam forming PEX-C.

The present method includes predetermining what performance is needed for the assembly. Then, in one embodiment, preparing a pre-compounded material for each component with an amount of antioxidant based on the desired crosslinking percentage needed at a fixed and substantially constant level of radiation. This pre-compounded material is then molded, such as by extrusion, injection molding, or other forming or molding process, to form each thermoplastic component before crosslinking. During formation of the assembly with other components of compatible thermoplastic materials, melt fusion in the thermoplastic interfacial region between the components forms a material to material bond. A calculation is then made to determine one fixed and substantially constant level of radiation that will crosslink all of the components in the assembly at the same time to at least the minimum amount of crosslinking to meet the desired performance. Alternatively or additionally, portions of the assembly may be designed with different wall thicknesses. Alternatively or additionally, portions of the assembly may be shaded from the radiation by a shield. The end result is a pre-engineered assembly that uses a cost-effective raw material such as polyethylene, creates leak proof joints between components if desired, and by custom design, independently determines for each component the desired percentage of crosslinking from a fixed and substantially constant amount of radiation applied to the assembly to meet the performance specification without crosslinking each component separately.

The present method includes a step of selecting a desired performance parameter for a molded assembly. Then, the method includes controlling a first crosslinking percentage for the first polymeric component and a second crosslinking percentage for the second polymeric component independently for crosslinking using the same level of radiation to provide the desired performance parameter for the assembly after crosslinking. The assembly is oriented at an angle (A) between an orientation axis of the assembly and the electron beam direction, and exposed a predetermined number of times (N) to the radiation. The electron beam is operable to deliver a predetermined substantially constant amount of radiation (R) in the electron beam direction providing a total radiation exposure (E) proportional to (N×R) providing the desired component crosslinking percentages in the first and second components, the resulting assembly having the desired performance parameter. Controlling the crosslink percentage, as used herein and the appended claims, means to vary parameters such as disclosed herein to provide a minimum crosslink percentage, or to not exceed a maximum crosslink percentage, or to provide a crosslink percentage within a desired range, or to provide a specified crosslink percentage. In any event, it is contemplated that some variation in crosslink percentage will occur due to ordinary tolerances and variation in manufacturing processes, materials, and wall thicknesses. It is not necessary in many applications of the present invention to provide an assembly with components having a precise crosslink percentage, but instead falling within a desired range taking into account ordinary tolerances and variation of the manufacturing processes used. The crosslink percentage, as used herein, means the crosslink density, or the amount of crosslinked polymer as a percent of the whole.

The present method includes controlling the crosslinking percentage for each polymeric component independently for crosslinking by radiation, such as by electron beam, exposing each component of the assembly to the same level of radiation. To control the crosslinking percentage of a component, one or more techniques may be employed, including for example increasing or decreasing the wall thickness of the component in desired portions of the component, increasing or decreasing an amount of antioxidant additive into the component material, increasing or decreasing an amount of crosslinking agent additive into the component material, increasing or decreasing the density of the component material, increasing or decreasing a filler additive in the thermoplastic materials, and providing a shield sufficient to cover all or a portion of one or more components.

Figure 3:
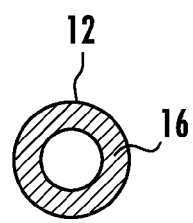
FIG. 3 is a cross-sectional view of the exemplary assembly of FIG. 2 taken along line 3-3 through the tube.
Figure 4:
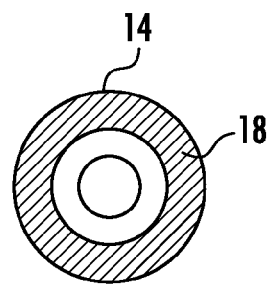
FIG. 4 is a cross-sectional view of the exemplary assembly of FIG. 2 taken along line 4-4 through the overmolded fitting.
Figure 5:
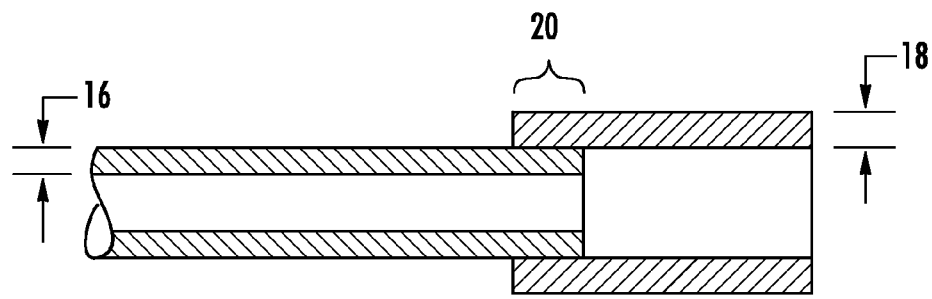
FIG. 5 is a longitudinal cross-sectional view through the exemplary assembly of FIG. 2.

As an example, an assembly 10 is shown in FIG. 1 having a first polymeric component 12 and a second polymeric component 14. In this example, the first polymeric component 12 is a tube and the second polymeric component 14 is an overmolded fitting. As shown in FIGS. 3 through 5, the tube 12 includes a tube wall thickness 16, and the fitting includes a fitting wall thickness 18. As shown in FIG. 5, the first polymeric component 12 and the second polymeric component 14 are bonded together at an interfacing connection portion 20. In this application, the fitting 14 is overmolded onto the tube 12 such that there is a material to material bond between the components at the interfacing connection portion 20.

The wall thickness of one or more components may be varied as desired to achieve a desired crosslinking effect and performance. When the assembly passes through the electron beam, the electrons enter the assembly and may pass through the assembly, the material in the assembly closest to the source of the beam receiving the highest amount of radiation and the most crosslinking, and the material furthest from the source receiving the least amount of radiation and the least crosslinking. In one application, the electron beam has the power to pass through about 1 inch of polymeric material having a material density of about 1 $g/cm^3$, where the dose of radiation at the top of the material thickness provides the greatest amount of crosslinking; with the radiation and the amount of crosslinking diminishing through the thickness to approximately no crosslinking after passing through about 1 inch of cumulative material thicknesses. In this example, the electron beam will pass through multiple layers or arrangements of various material thicknesses, but is limited to a combined total of about 1 inch of material thicknesses measured in the direction of the electron beam. The electron beam typically passes through an increased thickness of material having a material density less than 1 $g/cm^3$, and typically passes through less thickness of material having a material density greater than 1 $g/cm^3$.

By providing a greater wall thicknesses in one or more components, or desired portions of one or more components, for a given number of passes under the electron beam, the crosslink percentage of the component with the thicker wall thickness may be less than the crosslink percentage of the thinner wall thickness components. The material thickness may be used to provide a different crosslink percentage in one component than another. For example, a tube with an overmolded fitting may require 85% crosslink percent in the tube to ensure certain physical properties, where it may be desired to provide 50% crosslink percent in the fitting to retain elongation or meet other required performance of the fitting. The wall thickness of the fitting may be increased so that after a desired number of passes under the beam to crosslink the tube to 85%, the fitting has only reached 50% crosslinked. In another example, a crosslinked assembly of a tube with an overmolded fitting may require a specified strength test, such as a burst test, where the set exposure to the beam provides 85% crosslink percent in the tube and 65% crosslink percent in the fitting. The wall thickness of the fitting may be selected to be thicker than the wall thickness of the tube to pass the performance test when the fitting is at a lower crosslink percentage. As an example, one alternative of the assembly shown in FIG. 5 includes the fitting wall thickness 18 of about 0.080 inch and the tube wall thickness 16 of about 0.055 inch for a 65% minimum crosslink percent of both components of the assembly. The wall thicknesses may be varied as desired to control the crosslink percent and the performance of the assembly.

The amount of crosslinking in each component may also be controlled independently by providing different material densities from one component to another. As such, increasing or decreasing polymer density either by material selection or by selection and addition of additives such as talc, glass, carbon black, titanium dioxide, zinc oxide, alumina, and/or other fillers and/or other pigments may affect crosslinking. As discussed above, higher material density adds resistance to the electron beam passing through the polymer material. Conversely, selecting material with a lower material density may provide higher crosslinking percentage as compared to a component having a higher material density.

The amount of crosslinking in each component may be controlled independently by providing desired amounts of antioxidant additives in each component material. Each component in the assembly may be provided with a predetermined concentration of antioxidant determined individually for each component. The concentration of antioxidant may be different for each component in the assembly. In one application, the antioxidant concentration in the first polymeric component is different than the antioxidant concentration in the second polymeric component of the assembly. The antioxidant additives are typically added to the component polymeric material prior to the molding of the component, such as in a desired concentration mixed with colorants and/or other additives.

During thermoplastic molding, polymers are subjected to elevated temperatures sufficient to soften the thermoplastic material to be formable, and in certain processes, flowable as a fluid. When a polymer, such as polyethylene as one example, is raised to such an elevated temperature to mold or form a component, the polymer will generally be subjected to thermal and oxidative degradation. Polymer degradation occurs when the elevated temperature causes carbon and hydrogen in the polymer chains to form free radicals. Free radicals are highly reactive molecular fragments having one or more unpaired electrons. Additionally, during radiation crosslinking, the radiation beam cuts polymer chains forming carbon and hydrogen free radicals. In either event, the free radicals are reactive with oxygen, which begins an oxidation reaction that forms peroxy free radicals as well as additional carbon and hydrogen free radicals within the polymer chains. The peroxy free radicals are highly reactive and tend to take hydrogen from the polymer chains to form hydroperoxides, which creates additional carbon and hydrogen free radicals within the polymer chains. Left unchecked, the degradation process becomes an auto-oxidation chain reaction that degrades the polymer. Polymer degradation shortens polymer molecular chain length and molecular weight, which reduces material physical properties and longevity.

To prevent this possible degradation from occurring, antioxidants are incorporated with the polymer. The antioxidants reduce the effect of oxidation by reacting with available oxygen and/or other free radicals. Antioxidants are generally classified as primary antioxidants and secondary antioxidants. Primary antioxidants are typically amine and/or hindered phenol-based materials compounded for inhibiting oxidation over the service life of the finished product. Secondary antioxidants are typically phosphates and/or hindered phenols, where the molecular weight of the secondary antioxidants is generally lower than the molecular weight of the primary antioxidants. The secondary antioxidants are compounded for inhibiting oxidation during processing by decomposing hydroperoxides into non-reactive compounds.

The antioxidants are mixed with the polymer before molding so that the antioxidants are blended with the polymer when heated for molding. Typically, the antioxidant is blended with a colorant additive so that as the natural resin is colored, it obtains a loading of antioxidant at a particular concentration. In the past, each component in a crosslinked polymer assembly included the same concentration of antioxidant for inventory, compounding, and production reasons. In the present process, however, the primary and secondary antioxidant concentration is predetermined for each component and the colorant/antioxidant additive compounded uniquely for each component.

The predetermined concentration of antioxidant is determined individually for each component as a function of one or more parameters selected from the group consisting of the thermoplastic material each component is made of, the wall thickness of each component, the angle (A) between the assembly orientation axis and the direction of the radiation, the predetermined substantially constant amount of radiation (R) delivered by the electron beam in the radiation direction, the number of times (N) for exposing the oriented assembly to the electron beam, and the desired final crosslinking percentage for each component.

The concentration of secondary antioxidant for each component includes the sum of the amount of secondary antioxidant needed to stabilize the polymer during molding and subsequent processing of the component prior to crosslinking, and a desired amount of secondary antioxidant to effect the rate of crosslinking. As discussed above, during the step of crosslinking by irradiation, exposure to the radiation beam removes hydrogen atoms from the polymer chain forming a free radical. To facilitate crosslinking, it is desired that the unstable free radical of one polymer chain seek another free radical of another polymer chain to form a stable intermolecular crosslink. However, when antioxidants are present, the antioxidants react with available free radicals preventing a crosslink from forming at that site. Providing an increased amount of secondary antioxidant in a component during the crosslinking process slows the rate of crosslinking because the antioxidant neutralizes the reactive polymer. Conversely, providing a low concentration or an insignificant amount of secondary antioxidant in the component during crosslinking enables the crosslinking reactions to progress unimpeded. In this manner, the rate of crosslinking can be affected by increasing or decreasing the amount of antioxidant in each component.

The amount of crosslinking in each component may be controlled independently by providing desired amounts of crosslinking agent additives in each component material. Each component in the assembly may be provided with a predetermined concentration of crosslinking agent determined individually for each component. The concentration of crosslinking agent additive may be different for each component in the assembly. In one application, the concentration of crosslinking agent additive in a first polymeric component is different than the crosslinking agent concentration in a second polymeric component of the assembly. The crosslinking agent additives are typically added to the component polymeric material prior to the molding of the component, such as in a desired concentration mixed with colorants, antioxidants, and/or other additives. Crosslinking agents are molecules that are highly reactive towards free radicals increasing crosslinking efficiency. Typically, the crosslinking agents operate to bond to free radicals on the polymer chains. The crosslinking agents are such that the chemical reaction bonding the crosslinking agent and the free radical on the polymer chain modifies the crosslinking agent forming a new free radical on the crosslinking agent. This new free radical seeks a bonding reaction with other free radicals such as on other polymer chains, thereby creating cross-links by forming molecular bridges between chains.

Crosslinking agents are typically classified as Type I molecules that are polar molecules that use the molecular polarity to increase the rate of crosslinking. However, the polarity of the molecules also limits the use of Type I molecules to compatible polymers. Some examples of Type I crosslinking agents are acrylates, methacrylates, bismaleimides, vinyl esters, and zinc salts. Type II crosslinking agents are less polar and are compatible with many thermoplastics. The Type II molecules typically do not affect the rate of crosslinking because of their low polarity. Some examples of Type II crosslinking agents are: allylic compounds, low molecular weight vinyl polymers, high-vinyl 1,2-polybutadiene, divinylbenzene, allyl esters of cyanurates, isocyanurates, and sulphur. Several commercially available crosslinking agents are shown in TABLE 1. In one example, at least one component of the assembly may be made of high density polyethylene, and the crosslinking agent may include triallyl isocyanurate anhydride (TIAC).

TABLE 1

| Crosslinking Agents | |
|---|---|
| Type I | Type II |
| N,N-m-phenylenedimaleimide (BMI-MP) | Cis-1,2-polybutadiene (1,2-BR) |
| Ethylene dimethacrylate (EDMA) | Diallylterephthalate (DATP) |
| Ethylene glycol dimethacrylate (EDMA) | Divinylbenzene (DVB) |
| Trimethylolpropane trimethacrylate (TMPTM) | Triallylcyanurate (TAC) |
| | Triallylisocyanurate (TAIC) |
| Trimethylolpropane trimethylacrylate (TMPTMA) | Triallylisocyanurate anhydride (TIAC) |
| m-phenylene bismaleimide (HVA2) | Triallylphosphate (TAP) |
| Zinc dimethacrylate (ZDMA) | 1,2 Vinyl polybutadiene resin (PBD/S) |
| Butylene glycol dimethacrylate (BDMA) | PBD/S adducted with maleic anhydride (PBD/MA) |
| | Triallyl trimellitate (TAM) |
| | Diallyl phthalate (DAP) |

Figure 6:
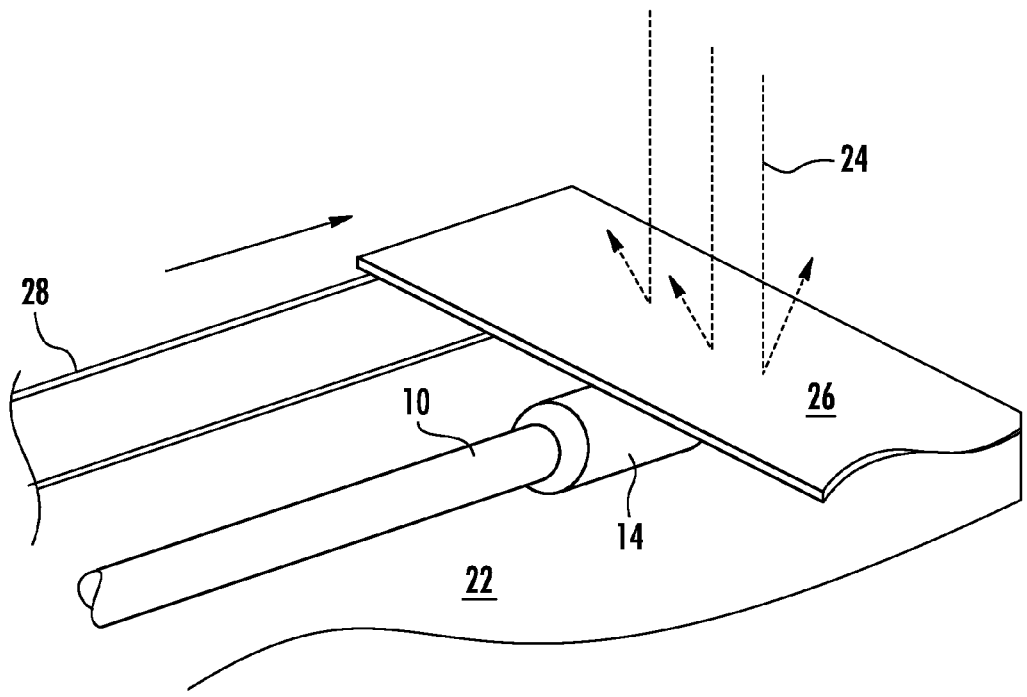
FIG. 6 is a partial perspective view of the assembly of FIG. 1 shown partially shielded from an electron beam during a crosslinking process of the present invention.

The amount of crosslinking in each component may be controlled independently by providing shielding to shade all of, or portions of, one or more components in the assembly from the crosslinking radiation. The placement of a shield of aluminum or steel or other shielding material over a portion of the assembly as desired inhibits radiation beneath the shield, and thereby inhibits crosslinking beneath the shield. The shield may be placed to shadow a portion of the assembly for a predetermined number of passes under the radiation beam, and then the shield removed unshielding the previously shielded portion to be exposed to crosslinking. Alternatively, the shield may be removed for a predetermined number of passes beneath the electron beam to establish a desired crosslinking percentage, and then the shield put in place to shadow a portion of the assembly for the remainder of passes under the radiation beam enabling the unshielded portion to receive additional crosslinking. In yet another alternative, for certain applications the shield may remain in place for all of the passes under the electron beam. In one alternative, such as the example shown in FIG. 6, the assembly 10 may be placed on a conveyor 22 passing under an electron beam 24. A shield 26 may be positioned over a portion of the assembly 10, such as over the fitting 14 to inhibit crosslinking of the fitting as the assembly 10 passes beneath the electron beam 24 on the conveyor 22. The conveyor 22 may be a cart, a conveyor belt, or any other vehicle or conveyance suitable to support the assembly passing through the electron beam 24. A fixture may be provided on the conveyor 22 to support, orient and/or position certain assemblies and shields as desired as the assemblies pass through the electron beam.

In one example, a fixture for positioning a plurality of longitudinal members during irradiation may include a base portion, and a plurality of first fingers having a first height positioned in spaced relation across a lateral extent of the base portion, each of the plurality of first fingers with an adjacent first finger forming a space therebetween adapted to receive at least a portion of one of said longitudinal members. A second plurality of fingers having a second height may be positioned in spaced relation across the lateral extent of the base portion, the second height greater than the first height, each of the plurality of second fingers with an adjacent second finger forming a space therebetween adapted to receive at least a portion of one of said longitudinal members above the height of the first fingers. In this example, the first plurality of fingers and second plurality of fingers are in alignment. For certain applications, the fixture may include a third plurality of fingers having a third height positioned in spaced relation across the lateral extent of the base portion, the third height greater than the second height, each of the plurality of third fingers with an adjacent third finger forming a space therebetween adapted to receive at least a portion of one of said longitudinal members above the height of the second fingers, where the third plurality of fingers are aligned with the first plurality of fingers and the second plurality of fingers. The fixture may include a carriage movable transverse to the lateral extent of the base portion, the carriage adapted to engage a movable portion of one or more of said longitudinal members, and a guide facilitating movement of the carriage and said movable portion of one or more of said longitudinal members transverse to the lateral extent of the base portion.

Figure 7:
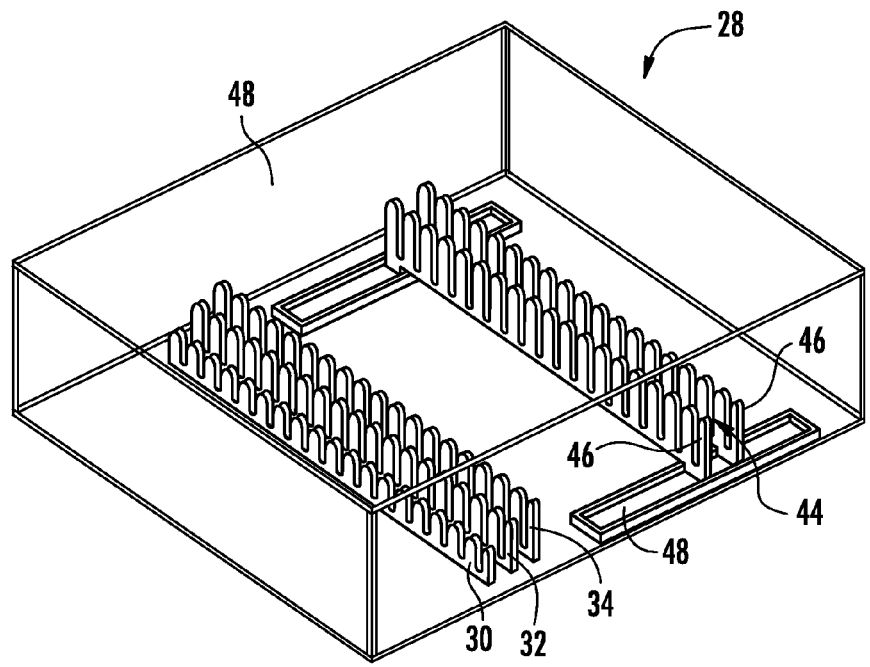
FIG. 7 is a diagrammatical perspective view of a basket configured for positioning assemblies of the present invention during crosslinking.
Figure 8:
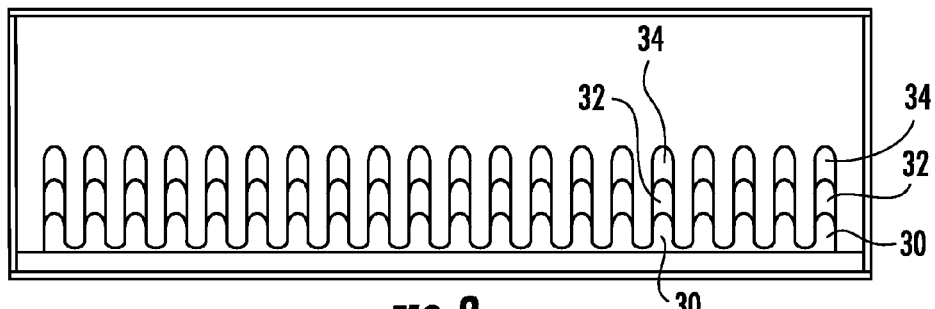
FIG. 8 is a diagrammatical front view of the basket of FIG. 7.
Figure 9:
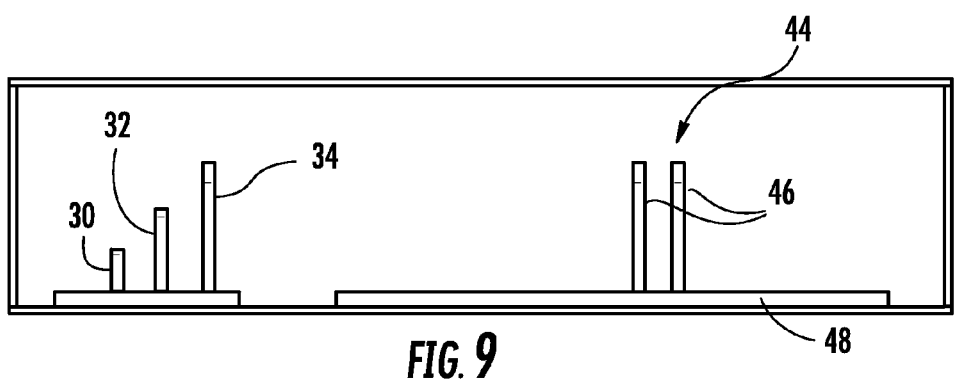
FIG. 9 is a diagrammatical side view of the basket of FIG. 7.

In one illustrative embodiment shown in FIG. 7, a fixture may be in the form of a basket 28. The basket 28 may include fixtures such as supports, fixtures, clips, clamps, blocks, cradles, hooks, forms, and/or other devices to support and position assemblies in a desired orientation for controlling the amount of crosslinking of various components. In certain applications, assemblies may be positioned in the basket in layers, for increasing the number of assemblies in each basket or facilitating placement of various geometries and sizes of assemblies in the basket. As shown for example in FIGS. 7 through 9, the basket 28 includes a plurality of fixturing fingers 30 spaced apart such that an assembly 40 may be nested between two adjacent fingers 30. As an example, the assembly 40 shown in FIG. 10 may include the fitting 14 overmolded onto the tube 12 such that there is a material to material bond between the components. Additionally, a nut 42 may be provided on the tube 12 slidable along the tube for installation of the assembly in a desired application (not shown). A plurality of the fingers 30 may be provided across the width of the basket 28 as shown in FIG. 7. For example, 13 fingers 30 may be provided across the width of the basket enabling 12 assemblies 40 to be nested between adjacent fingers 30 across the width. In another example, 31 fingers 30 may be provided across the width of the basket enabling 30 assemblies 40 to be nested between adjacent fingers 30 across the width. Any number of fingers may be provided and arranged in the basket 28 to accommodate the assembly being crosslinked and the desired orientation of the assembly relative to the electron beam for controlling the amount of crosslinking of various components. Each fixture may be provided with a shape and orientation as desired cooperative with the shape of the assembly to be crosslinked and the desired orientation of the assembly relative to the electron beam for controlling the amount of crosslinking of various components.

In the example of FIG. 7, the basket 28 further includes a plurality of second fixturing fingers 32 spaced apart such that an assembly 40' may be nested between two adjacent second fingers 32, the second fingers 32 being adjacent the fixturing fingers 30 and elevationally higher than the fingers 30 such that the assemblies 40' nested between the second fingers 32 form a second layer of assemblies 40' in the basket positioned over the layer nested between the fingers 30. In the example of FIG. 7, an upper portion of the fingers 30 may be used to support a portion of the assemblies 40' in the second layer.

In the example of FIG. 7, the basket 28 further includes a plurality of third fixturing fingers 34 spaced apart such that an assembly 40" may be nested between two adjacent third fingers 34, the third fingers 34 being adjacent the fingers 32 and elevationally higher than the fingers 32 such that the assemblies 40" nested between the third fingers 34 form a third layer of assemblies 40" in the basket positioned over the layer nested between the second fixturing fingers 32. In the example of FIG. 7, an upper portion of the second fingers 32 may be used to support a portion of the assemblies 40" in the third layer. Optionally, not shown, additional layers of assemblies may be provided in the basket as desired accommodating the assembly being crosslinked and the desired orientation for controlling the amount of crosslinking of various components. In any event, the assemblies may be placed multiple levels in the basket 28 or other box or container as the assemblies pass beneath the electron beam, controlling the number of layers and position of the assemblies to control shadowing of lower layers by upper layers. Layering assemblies during crosslinking to receive the needed amount of electron beam irradiation typically enables higher throughput and lower cost. In certain applications it may be advantageous after the assemblies pass through the electron beam to turn the assemblies by rotating the container that the assemblies are nested in and then passing the assemblies through the electron beam in the new orientation. The container may be rotated 180 degrees turning the assemblies over to expose a bottom of the assemblies. In other applications, the containers may be rotated 90 degrees turning the assemblies partially over to expose a side of the assemblies, or may be rotated any amount as applicable to accommodate the shape and desired orientation of the assemblies. Alternatively, the assemblies may be rotated or turned over within the container that the assemblies are nested in and then passing the assemblies through the electron beam with the assemblies in the new orientation.

Figure 10:
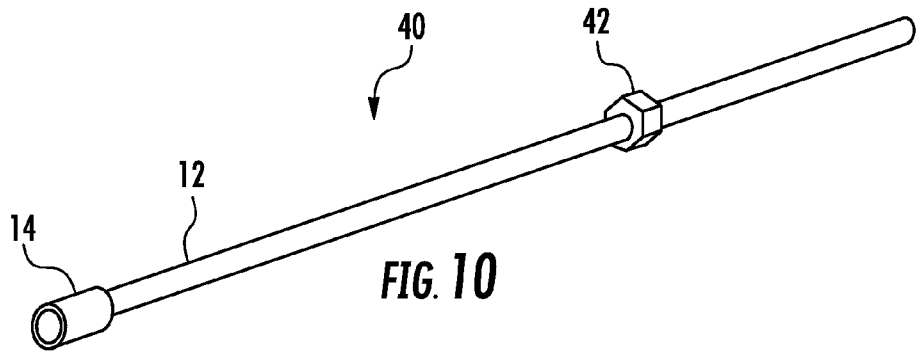
FIG. 10 is a side perspective view of the exemplary assembly of FIG. 1 showing a nut positioned over a portion of the tube.
Figure 11A:
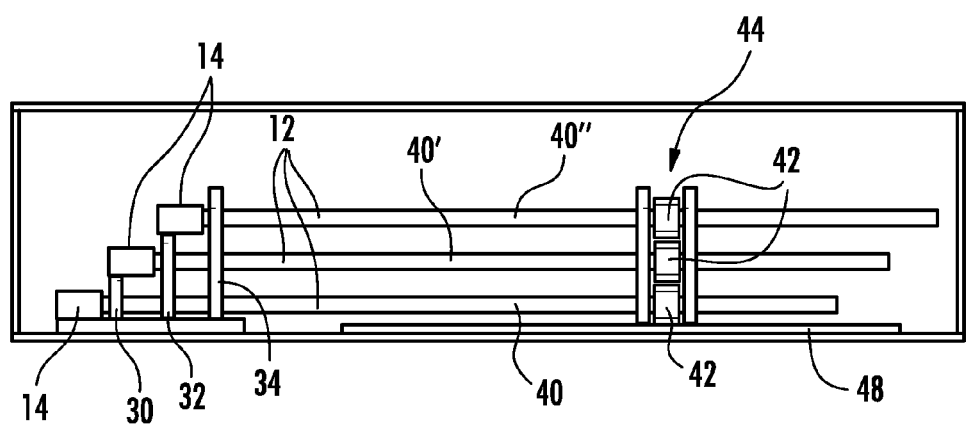
FIG. 11A is a diagrammatical side view of the basket of FIG. 9 showing a plurality of assemblies positioned in the basket for crosslinking with an exemplary nut of each assembly captured in a fixture in a first position.
Figure 11B:
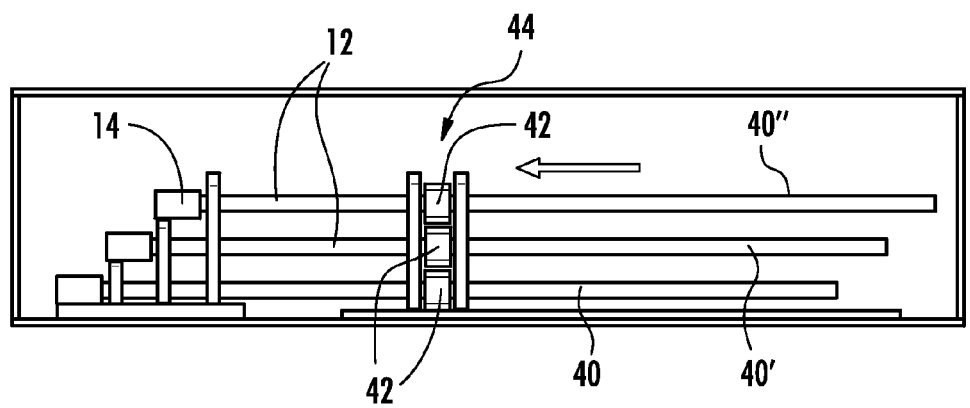
FIG. 11B is a diagrammatical side view of the basket of FIG. 11A showing the fixture capturing the exemplary nut of each assembly in a second position unshielding the material previously beneath the nuts in the first position.

In certain applications, a metal component, such as a steel nut may be present in the assembly undesirably acting as a shield shadowing the polymer beneath the metal component. In the example of FIG. 10, the assembly 40 may include a metal nut slidable along the tube, such as a brass or stainless steel nut. In this example, the nut 42 may be moved after a desired number of passes under the electron beam to unshield the material previously beneath the nut 42, and then the assembly further irradiated to crosslink the material previously shielded by the nut. As shown in FIG. 7, the basket 28 may include a carriage fixture 44 slidable within the basket 28 to facilitate moving shielding components such as metal nuts or other movable components that shield underlying polymeric material. In the alternative shown in FIGS. 7 and 9, the carriage fixture 44 includes a plurality of vertical fingers 46 positioned to capture the shielding components. The carriage fixture 44 may be movable along one or more guides 48. The guides 48 may be linear slides with or without bearings facilitating movement of the carriage fixture 44 along the guides. In other alternatives, the guides 48 may be rails, rods, bars, grooves, or other guides along which the carriage fixture is movable along the guide. The guides 48 may be linear or nonlinear as desired to accommodate the assembly being crosslinked. In the example of FIG. 7, two guides 48 as linear slides are provided for moving the carriage fixture 44. The carriage fixture 44 may be configured to enable an operator to adjust the position of metal nuts or other movable shielding components in one or more groups. In certain applications, the carriage fixture 44 may control movement of all of the movable shielding components in the basket 28 as one group. As shown in FIGS. 11A and 11B, the nuts 42 of a plurality of the assemblies 40 may be positioned between the fingers 46 such that all of the nested nuts 42 may be moved together after a desired number of passes under the electron beam to unshield the material previously beneath the nuts. Alternatively, two or more carriage fixtures may be provided (not shown) as desired to control movement of shielding components in the basket.

The present method includes controlling the crosslinking percentage for each polymeric component independently for crosslinking using the same level of radiation to provide the desired performance parameter for the assembly after crosslinking. In one application, the desired performance parameter is a tensile test pulling the first polymeric component and the second polymeric component in opposite directions until failure of one or more components of the assembly. Alternatively, the desired performance parameter is a burst test wherein the component is subjected to a fluid pressure until failure of one or more components of the assembly. For example, in one application, the first polymeric component is an extruded tube and the second polymeric component includes an interior cavity in fluid communication with the tube. In this application, the burst test includes increasing the pressure of a fluid within the tube and cavity until failure.

In another alternative, the present method may include varying for each of the components in the assembly independently at least one parameter selected from the group consisting of component wall thickness, antioxidant additive, crosslinking agent additive, polymer density, and shielding of the component during crosslinking to provide the desired performance parameter for the assembly after crosslinking by an electron beam operable to deliver a predetermined substantially constant amount of radiation. In this example, each component is independently customized such that the assembly provides the desired performance after the assembly is crosslinked under the electron beam. By analogy, the customization of each component may be compared to a chain of links, where each link has a different size, shape, and performance before crosslinking, where the chain represents the assembly and each link represents a component in the assembly, and where the chain breaks at the weakest link. For the assembly to pass the desired performance parameter, such as a pull test, each component is customized so that the components each have the crosslink percent needed to provide the required performance parameter, so that all of the components combined together in the assembly meet at least the minimum performance. For example, a relatively weaker link component before crosslinking may require 85% crosslink percentage, where a relatively stronger link component before crosslinking may require 40% crosslink percentage to together in the assembly provide the desired performance parameter.

In the practice of this invention, illustrative and non-limiting examples of the polymers that may be used in various combinations to form components for assembly include: polyacetals, nylons or polyamides, including various types of nylon-6, nylon-6/6, nylon-6/9, nylon-6/10, nylon-6/12, nylon-11, nylon-12, acrylonitrile butadiene styrene terpolymers, polystyrenes, polycarbonates, polyvinyl chlorides and chlorinated polyvinyl chlorides, polyethylene homopolymers and copolymers, including all molecular weight and density ranges and degrees of crosslinking, polypropylene homopolymers and copolymers, polybutene resins, poly (meth)acrylics, polyalkylene terephthalates, polyetherimides, polyimides, polyamide-imides, polyacrylates of aromatic polyesters, polyarylether ketones, polyacrylonitrile resins, polyphenylene oxides including polystyrene miscible blends, polyphenylene sulfides, styrene-acrylonitrile copolymers, styrene-butadiene copolymers, styrene maleic anhydride copolymers, polyarylsulfones, polyethersulfones, polysulfones, ethylene acid copolymers, ethylene-vinyl acetate copolymers, ethylene-vinyl alcohol copolymers, thermoplastic elastomers covering a hardness range of from 30 Shore A to 75 Shore D, including styrenic block copolymers, polyolefin blends (TPO), elastomeric alloys, thermoplastic polyurethanes (TPU), thermoplastic copolyesters, and thermoplastic polyamides, polyvinylidene chlorides, allyl thermosets, bismaleimides, epoxy resins, phenolic resins, unsaturated thermoset polyesters, thermoset polyimides, thermoset polyurethanes, and urea and melamine formaldehyde resins. Other polymeric materials may be selected as suitable for a desired application.

In a preferred embodiment, the polymer for at least one component in the assembly will be high density polyethylene which is subsequently crosslinked by the application of an electron beam as discussed herein.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A process for making a crosslinked assembly comprising the steps of:
   selecting a desired performance parameter for a molded assembly of a first polymeric component of a first thermoplastic material having a first component wall thickness and a first connection portion, and a second polymeric component of a second thermoplastic material having a second component wall thickness and a second connection portion bonded to the first connection portion,
   varying for each of the first polymeric component and second polymeric component independently at least one parameter selected from the group consisting of antioxidant additive, crosslinking agent additive, filler additive, pigment additive, and polymer density to provide the desired performance parameter for the assembly after crosslinking by an electron beam operable to deliver a predetermined amount of radiation (R), orienting the assembly at an angle (A) between an orientation axis of the assembly and an electron beam direction, exposing the oriented assembly a number of times (N) to the electron beam operable to deliver a predetermined amount of radiation (R) in the electron beam direction providing a total radiation exposure (E) proportional to (N×R), providing the first component crosslinking percentage and the second component crosslinking percentage, the crosslinked assembly having the desired performance parameter.

2. The process for making a crosslinked assembly of claim 1, further comprising varying the first component wall thickness and the second component wall thickness independently to provide the desired performance parameter for said assembly after crosslinking by an electron beam operable to deliver a predetermined amount of radiation (R).

3. The process for making a crosslinked assembly of claim 1, further comprising a third polymeric component of a third thermoplastic material having a third component wall thickness and a third connection portion bonded to the first or second polymeric component, and varying for the third polymeric component independently at least one parameter selected from the group consisting of component wall thickness, antioxidant additive, crosslinking agent additive, polymer density, and shielding of the component during crosslinking to provide the desired performance parameter for said assembly after crosslinking by an electron beam operable to deliver a predetermined amount of radiation (R).

4. The process for making a crosslinked assembly of claim 3, further comprising a fourth polymeric component of a fourth thermoplastic material having a fourth component wall thickness and a fourth connection portion bonded to the first, second, or third polymeric component, and varying for the fourth polymeric component independently at least one parameter selected from the group consisting of component wall thickness, antioxidant additive, crosslinking agent additive, polymer density, and shielding of the component during crosslinking to provide the desired performance parameter for said assembly after crosslinking by an electron beam operable to deliver a predetermined amount of radiation (R).

5. The process for making a crosslinked assembly of claim 1, where the first thermoplastic material is high density polyethylene.

6. The process for making a crosslinked assembly of claim 1, where the first thermoplastic material and the second thermoplastic material are the same.

7. The process for making a crosslinked assembly of claim 1, where the desired performance parameter is a tensile test pulling the first polymeric component and the second polymeric component in opposite directions until failure of one or more components of the assembly.

8. The process for making a crosslinked assembly of claim 1, where the first polymeric component is an extruded tube and the second polymeric component comprises a cavity in fluid communication with an inside of the tube, and where the desired performance parameter is a burst test increasing the pressure of a fluid within the tube and cavity until failure.

* * * * *